Patented Dec. 15, 1931

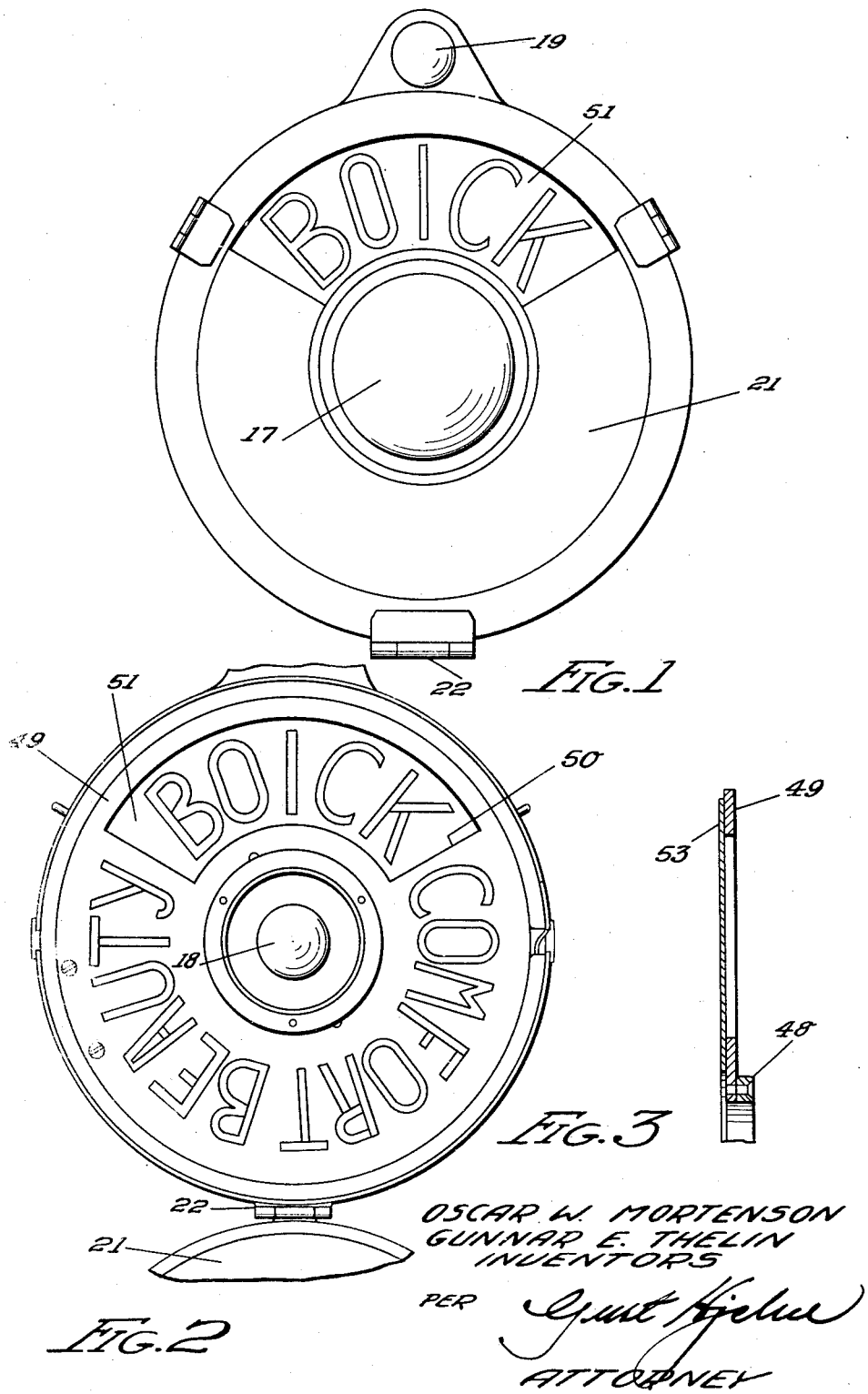

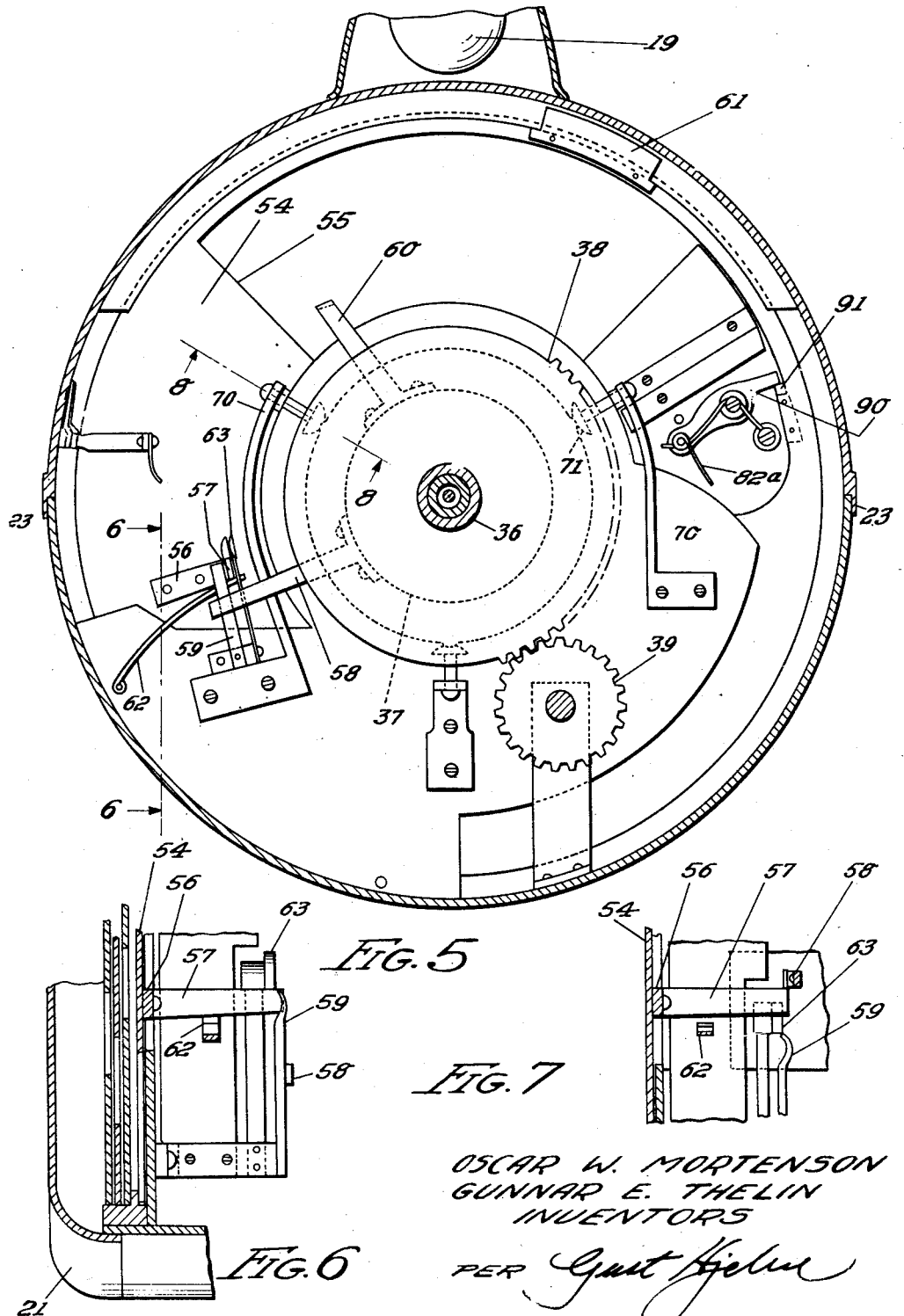

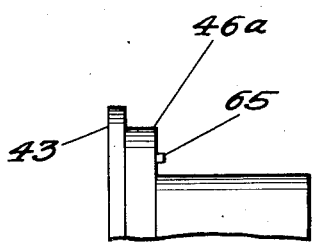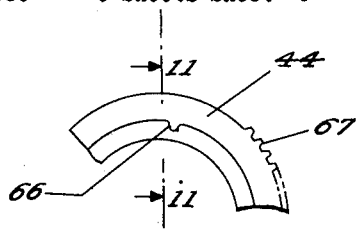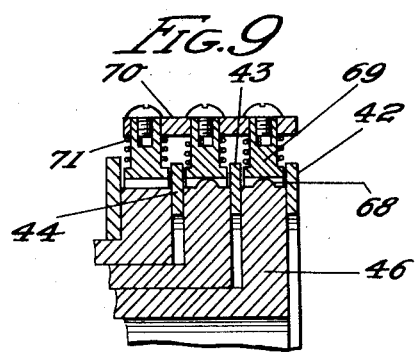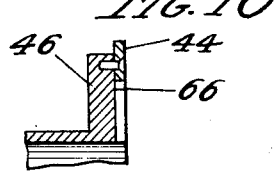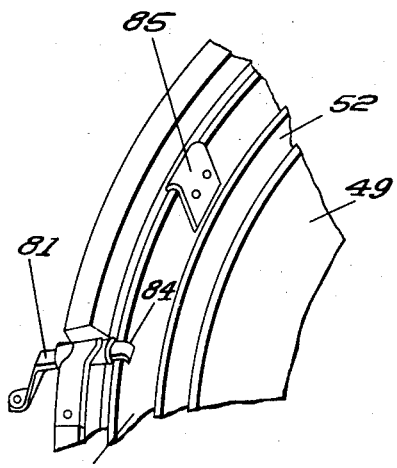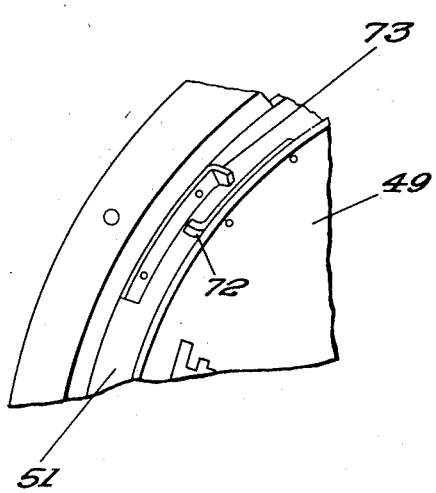

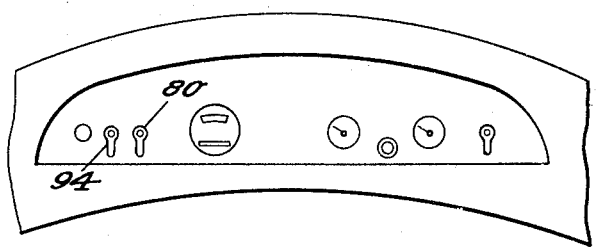
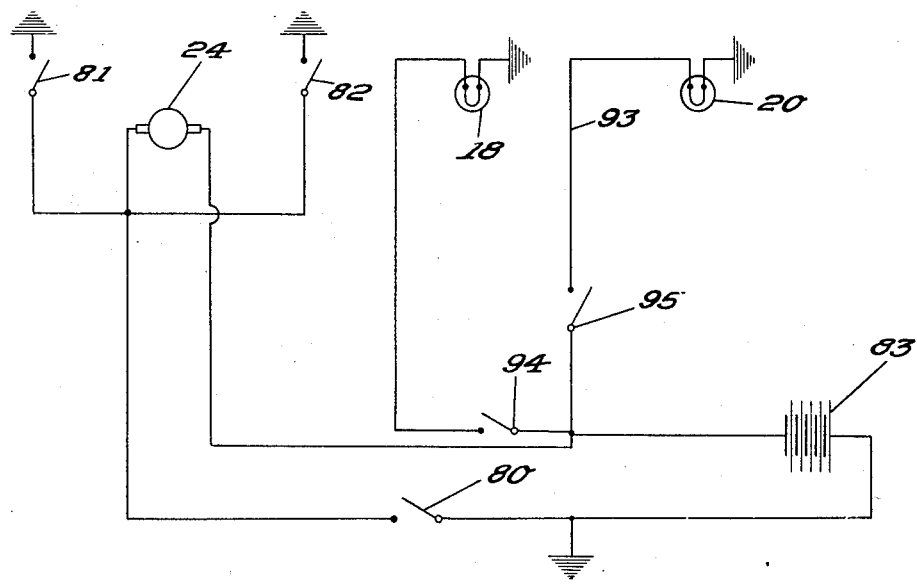
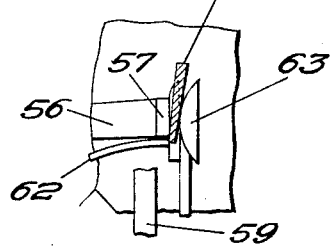

1,836,983

UNITED STATES PATENT OFFICE

OSCAR W. MORTENSON AND GUNNAR E. THELIN, OF CHICAGO, ILLINOIS

ILLUMINATED SHIFTABLE WORD SIGN

Application filed March 12, 1930. Serial No. 435,093.

This invention relates to an improved illuminated shiftable word sign, and has for one of its principal objects the provision of such a sign which can be placed on the rear of an automobile in conjunction with the tail-light and spotlight, so that persons in another car or cars behind an automobile so equipped will be attracted by this shiftable sign and induced to read the message conveyed thereby.

One of the important objects of this invention is to provide an illuminated shiftable word sign, particularly for use on automobiles, but which is also adaptable for use in many other ways, such as window displays, street signs, and the like, and which will convey a message consisting of a plurality of words in proper sequence, each word being separately displayed for a sufficient length of time to enable it to be readily discernible, and which, moreover, will provide for the display of such words in various colors.

Still another and further important object of this invention is the provision of an illuminated shiftable word sign which is particularly adapted for use with automobiles, and which is so constructed that a definite sentence having a definite beginning and ending will be conveyed by the sign while in operation and which moreover will automatically stop at a certain predetermined word of the sentence when the shiftable operation of the sign is discontinued, thereby conveying a certain definite intelligible message to the beholder.

Other and further important objects of the invention will be apparent from the disclosures in the accompanying drawings and following specification.

The invention, in a preferred form, is illustrated in the drawings and hereinafter more fully described.

In the drawings:

Figure 1 is an elevation of the improved sign of this invention showing the same with the key word of an advertising sentence displayed thereon. This keyword is always automatically shown when the sign comes to rest after its movable operation has been discontinued.

Figure 2 is a similar view of the sign with the outer casing removed and showing two of the shiftable panels, the rotative motion of which conveys a certain definite message in a word sequence.

Figure 3 is a sectional view of one of the shiftable panels showing particularly the transparent colored backing whereby an illuminated colored word is displayed.

Figure 5 is a sectional view taken on the line 5—5 of Figure 4.

Figure 6 is a partial sectional view taken on the line 6—6 of Figure 5.

Figure 7 is a detail view of certain of the parts shown in Figure 6 in a different operating position.

Figure 8 is a partial sectional view taken on the line 8—8 of Figure 5.

Figure 9 is an elevation of a portion of one of the mutilated gears for operating the panels.

Figure 10 is a front elevation of a portion of another such mutilated gear.

Figure 11 is a sectional view taken on the line 11—11 of Figure 10.

Figure 12 is a detail perspective view of a portion of one of the rotatable word display panels together with associated parts, for electric current control.

Figure 13 is a perspective view of two other panels showing their connected operating arrangement.

Figure 14 is an enlarged detail view of a portion of the mechanism for shifting the opaque screen which operates to shut off the illumination for a short period while the word signals are being shifted.

Figure 15 is an elevation of an automobile dash including control switches for the sign of this invention.

Figure 16 shows the wiring diagram for the sign.

As shown in the drawings:

Figure 4:
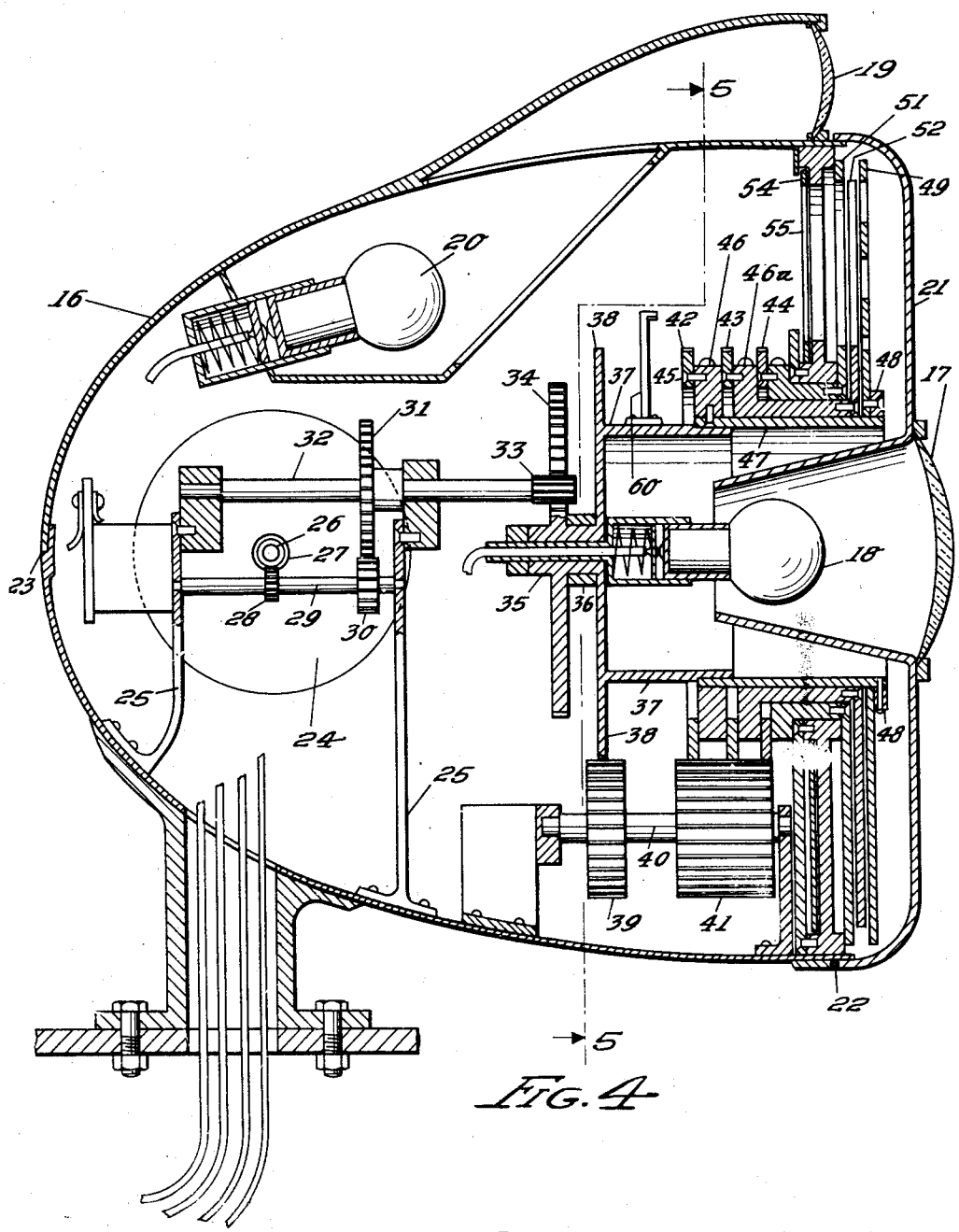
Figure 4 is a sectional view showing the interior arrangement of the sign operating mechanism.

The reference numeral 16 indicates generally the casing for the improved illuminated shiftable word sign of this invention, this casing being preferably in the form of a hemi-ellipsoid, but which, of course, may be of any other shape as desired or convenient.

The rear face of the casing is substantially flat, and has in the center thereof a red glass bull's-eye or the like 17 behind which is positioned a globe 18 connected by proper wires to a switch on the brake pedal of the car whereby the usual stoplight action results.

At the upper end of the rear face of the casing is another and smaller bull's-eye 19 which is illuminated by light from the globe 20 and which acts as a tail-light for the automobile. The cover plate 21 in which the stoplight lens 17 is positioned is preferably hinged at the bottom as shown at 22 so that convenient access to the interior of the sign may be had, if necessary or desired. The top half of the casing 16 is also hinged or otherwise removably positioned as shown at 23 so that this may be removed in emergency.

A motor 24 is mounted upon suitable brackets 25 in the rear end of the casing, and the motor shaft 26 has fixed thereon a worm gear 27 which in turn operates a gear 28 on a shaft 29 which has at its rear end another gear 30 which is in mesh with a gear 31. The gear 31 is mounted on a shaft 32 which has on its rear end a pinion 33 in mesh with a large driving gear 34 mounted on a sleeve 35 which sleeve passes forwardly through the bearing 36 and terminates in a combined housing and gear wheel 37—38. The gear wheel 38 is a mutilated gear. This gear wheel in turn being in mesh during certain periods of its rotation with a gear 39 mounted on a shaft 40 in the bottom of the casing. Also on this shaft is a barrel-gear 41 which is adapted to be always meshed with one of a plurality of mutilated gear wheels 42, 43, and 44, the number of these gear wheels in this particular instance being three, and each having teeth on two-thirds of its periphery. By this arrangement, only one of each of the three mutilated gear wheels will be in operation at any one time. Obviously, the number of these mutilated gears may be increased, if desired, corresponding to the number of sign word panels which it is desired be rotated by the mechanism.

In the particular embodiment of the invention here shown, the mutilated gear wheel 42 is connected by means of set screws or the like 45 to an annular ring 46 which is in turn fastened to a sleeve 47, this sleeve extending rearwardly toward the cover plate 21 of the device, and having mounted upon its outer extremity an annular ring 48 to which in turn is fastened the outermost of the rotatable word panels 49. This word panel is shown in plan view in Figure 2, portions thereof being cut away as illustrated at 50 to show the key word of the sign which forms a portion of the innermost rotatable word panel 51, this word panel being actuated by and connected to the mutilated gear 44.

There is also in this particular embodiment of the invention an intermediate word panel 52 which is connected to and actuated by the mutilated gear wheel 43.

As best shown in Figure 3, each of the shiftable word panels is provided with a transparent backing 53 (not illustrated in Figure 4) which is of colored celluloid, cloth or some other similar material and which displays the word cut into the panel by means of a color illuminating effect.

At the rear of the rotatable panels is provided a shiftable shutter 54. This shutter has an opening 55 therein corresponding in size and shape to the size and shape of the word panels as illustrated in Figures 1 and 2 whereby the word panels will be illuminated from behind when the opening in the shutter is aligned therewith, and the shutter is rotatable through about 120 degrees of the circumference of the rear plate so as to adequately accommodate the size of any single word display. Fastened to the forward face of the shutter is a plate 56 which has an integral forwardly extending arm 57, this arm extending sufficiently forwardly so as to be contacted with an operating spring arm 58 which is fixed on the constantly rotated drum 37. Rotation of this drum 37 with its arm 58 will carry the shutter to the left and downwardly as viewed in Figure 5, thereby placing the opening 55 in alignment with any particular word stenciled into the rotatable word panels. The arm 57 is carried by means of the arm 58 to a locked position beneath a spring-pressed latch member 59, the arm 58 continuing to rotate with the drum 37 after sliding over the end of the arm 57, and the shutter is thereby held in open position as shown in Figures 4 and 5, until further rotation of the drum 37 brings a releasing arm 60 into contact with the cam-shaped face 63 of the latch member 59 as shown in Figure 7 and Figure 14, whereupon the latch 59 is pushed into releasing position, and the shutter will then be returned to closed position by means of a counterweight 61 which is mounted upon its periphery.

Positive action of this counterweight is accentuated by means of a leaf spring 62, the end of which is positioned directly beneath the arm 57 and which tends to push the arm upwardly when the latch member 59 is forced outwardly by the action of the releasing arm 60 riding over a cam portion thereof as illustrated at 63 in Figure 6.

In order that the mutilated gear wheels 42, 43, and 44, together with their associated panels, be operated in proper sequence, an operative connection is maintained therebetween, so that the teeth on each gear wheel will be carried into mesh with the barrel-gear 41, and a continuous operation of the device thereby assured. This is accomplished by means of a pin 65 projecting rearwardly from the face of the annular ring 46a upon which the mutilated gear 43 is fastened, this pin in turn contacting with a suitable projection 66 formed integral with the inner face of the mutilated gear 44, and which is at such a point with relation to the termination of the gear teeth 67 that contact of the pin 65 therewith will continue to rotate the gear 44 until such time as the gear teeth 67 will be enmeshed with the teeth on the barrel-gear 41, after which the mutilated gear 44 will continue to rotate of its own accord through that portion of its periphery which is provided with teeth.

In Figure 8 is illustrated a means for stopping the rotation of any one of the gear wheels and its associated annular ring after its particular gear teeth have become disengaged from the barrel-gear. This means comprises a rounded head which may be a screw head or the like 68, mounted in each of the annular rings elements 46, etc. associated with the gear wheels, these knobs being on the periphery of the ring elements and riding under spring-pressed stops 69, which are fastened to a bracket 70 extending across the outer ends of the gear wheels at a point shown in the section line 8—8 in Figure 5.

Contact of one of the knobs 68 with the corresponding spring-pressed element 69 will suffice to stop any rotation of the gear wheel and its associated parts through friction of adjoining gear wheels while at the same time the spring pressure of the helical springs 71 which operate the element 69 is not sufficient to prevent rotation of the gear wheels when actuated by the pins 65 coming in contact with a lug 66 as the knobs 68 will then simply slide out from under the elements 69.

Although adjacent gear wheels can be interconnected by means of pins and lugs 65 and 66 respectively as described, it is necessary that a further connection be made between the innermost and outermost gear wheels, as for example 42 and 44, so that continuous rotation of the device may be assured as long as the motor 24 is in operation. This is provided by so connecting the first and last panels 49 and 51 so that when the last word in the outermost panel 49 has been shown, the device will continue to operate to start the sequence of words over again. This is provided by means of a hook member 72 attached to the forward inner face of the panel 49 as best shown in Figure 13 which co-operates with the corresponding hook element 73 fastened to the outer face of the panel member 51. The positioning of these hook elements is so arranged with relation to the spacing of the gear teeth upon the corresponding operating mutilated gears that contact between the hooks 72 and 73 will carry the teeth on the mutilated gear 44 into mesh with the barrel-gear 41 whereupon the inner panel 51 will be put into operation, and as the gear teeth on the mutilated gear 42 which operates the panel 49 will by that time be out of mesh with the barrel-gear 41, the hook 73 will continue its forward travel, leaving the hook 72 and the associated panel 49 in stationary position.

The device is so arranged that after the operating switch 80 for the motor 24 is disconnected, the motor will continue to operate until such time as the key word, as shown in Figure 1, will assume its display position, whereupon the current will be finally shut off and the sign will remain stopped in this position. This is accomplished by incorporating a pair of secondary automatic switches into the motor circuit, these switches being indicated in the diagram at 81 and 82 respectively. The switch 81 is shown in Figure 12 and comprises an arm having a hooked end 84 which is in electrical contact with the innermost panel 51, this panel having the key word incorporated therein. As shown in the diagram, an opening of the switch 80 will still allow current to pass from the battery 83 through the motor 24 on account of the fact that the switch 81 is in closed position by the electrical contact between the metallic hook 84 and the metal plate 51 which is grounded to the car. However, at a predetermined point on the circumference of the panel 51 is positioned an insulating element 85, which is composed of fiber or the like, and as soon as this rides under the hook 84 the switch 81 is opened. At this particular point in the operation of the mechanism, the teeth on the mutilated gear 38 have just come out of contact with the gear wheel 39, and consequently, further rotation of all of the panels is stopped. However, on account of the fact that a closed circuit still exists at the switch point 82, this being indicated diagrammatically in Figure 16 and shown actually at 82a in Figure 5, the motor 24 continues to operate. The mutilated gear wheel 38 and the drum 37 together with the arms 58 and 60 therefore continue to rotate, and the arm 58 will contact with arm 57 on the shutter 54, thereby carrying the shutter around into open position, at which point the latch 59 operates and retains the shutter in such open position.

At the same time, rotation of the shutter to this point operates a trip 90 by means of a cam element 91 forming part of the shutter plate, this trip element opening the switch 82a. This shuts off the last current connection from the battery to the motor whereupon operation ceases, leaving the key word in display position with the opening in the shutter behind it adapted to be illuminated by light from the globe 20 which, forming part of the tail-light circuit 93 is switched on as occasion arises by operation of the switch 95.

It will be evident that herein is provided an advertising sign which is particularly adaptable for use with automobiles and which forms a very attractive and attention compelling device. Further, by the use of such an apparatus, a distinct message comprising a number of words in a sentence or the like can be presented to the public at large in many ways and with a minimum expenditure as compared with the ordinary costs of such advertising.

We are aware that many changes may be made, and numerous details of construction varied throughout a wide range without departing from the spirit of this invention, and we, therefore, do not purpose limiting the patent granted hereon otherwise than as necessitated by the prior art.

We claim as our invention:

1. An illuminated shiftable word sign, including a series of rotatable stencils, each stencil comprising a circular plate, and means for intermittently rotating the stencils, said means comprising a motor and shaft and gear connections between the motor and the stencils, said gear connections including a series of consecutively operated mutilated gears, a gear being provided for each stencil, and operating connections between the gears, said connections comprising a pin associated with one gear and a contacting lug associated with the adjacent gear.

2. An illuminated shiftable word sign, including a series of rotatable stencils, each stencil comprising a circular plate, and means for intermittently rotating the stencils, said means comprising a motor and shaft and gear connections between the motor and the stencils, said gear connections including a series of consecutively operated mutilated gears, a gear being provided for each stencil, and operating connections between the gears, said connections comprising a pin associated with one gear and a contacting lug associated with the adjacent gear, and means for stopping the rotation of any one gear at a predetermined point.

3. An illuminated shiftable word sign, including a series of rotatable stencils, each stencil comprising a circular plate, and means for intermittently rotating the stencils, said means comprising a motor and shaft and gear connections between the motor and the stencils, said gear connections including a series of consecutively operated mutilated gears, a gear being provided for each stencil, and operating connections between the gears, said connections comprising a pin associated with one gear and a contacting lug associated with the adjacent gear, and means for stopping the rotation of any one gear at a predetermined point with relation to the end of the period of rotation of the adjacent gear.

4. An illuminated shiftable word sign, including a series of rotatable stencils, each stencil comprising a circular plate, and means for intermittently rotating the stencils, said means comprising a motor and shaft and gear connections between the motor and the stencils, said gear connections including a series of consecutively operated mutilated gears, a gear being provided for each stencil, and operating connections between the gears, said connections comprising a pin associated with one gear and a contacting lug associated with the adjacent gear, and means for stopping the rotation of any one gear at a predetermined point with relation to the end of the period of rotation of the adjacent gear, said means comprising projections on the gear wheels, and spring-pressed stops adapted to co-operate with said projections.

5. An illuminated shiftable word sign, including a series of rotatable stencils, each stencil comprising a circular plate, and means for intermittently rotating the stencils, said means comprising a motor and shaft and gear connections between the motor and the stencils, said gear connections including a series of consecutively operated mutilated gears, a gear being provided for each stencil, and operating connections between the gears, said connections comprising a pin associated with one gear and a contacting lug associated with the adjacent gear, and means for stopping the rotation of any one gear at a predetermined point with relation to the end of the period of rotation of the adjacent gear, said means comprising projections on the gear wheels, and spring-pressed stops adapted to co-operate with said projections, together with means for stopping the rotation of a key stencil and its associated gear at a predetermined point.

6. An illuminated shiftable word sign, including a series of rotatable stencils, each stencil comprising a circular plate, and means for intermittently rotating the stencils, said means comprising a motor and shaft and gear connections between the motor and the stencils, said gear connections including a series of consecutively operated mutilated gears, a gear being provided for each stencil, and operating connections between the gears, said connections comprising a pin associated with one gear and a contacting lug associated with the adjacent gear, and means for stopping the rotation of any one gear at a predetermined point with relation to the end of the period of rotation of the adjacent gear, said means comprising projections on the gear wheels, and spring-pressed stops adapted to co-operate with said projections, together with means for stopping the rotation of a key stencil and its associated gear at a predetermined point regardless of the time of disconnection of current carrying means to the operating motor.

7. An illuminated shiftable word sign, comprising a series of superposed rotatable stenciled plates in a predetermined relation to each other, and means behind the plates for intermittently controlling the illumination.

8. An illuminated shiftable word sign, comprising a series of superposed rotatable stenciled plates in a predetermined relation to each other to form a sentence composed of words formed in plates, and a shutter behind the plates having an opening therein for intermittently controlling the illumination.

9. An illuminated shiftable word sign, comprising a series of superposed rotatable stenciled plates in a predetermined relation to each other to form a sentence composed of words formed in plates, together with additional means for stopping the rotation of the plates at a predetermined point to expose a key word of the sentence.

10. An illuminated shiftable word sign, comprising a series of superposed rotatable stenciled plates in a predetermined relation to each other to form a sentence composed of words formed in plates, together with illuminating means behind the stencils, and a rotatable shutter of the same size as the plates positioned between the plates and the illuminating means, and having an opening therein to intermittently control the lighting effect on the stencils.

11. An illuminated shiftable word sign, comprising a series of superposed rotatable stenciled plates in a predetermined relation to each other to form a sentence composed of words formed in plates, together with illuminating means behind the stencils, and a shiftable shutter between the illuminating means and the stencil.

12. An illuminated shiftable word sign, comprising a series of superposed rotatable stenciled plates in a predetermined relation to each other to form a sentence composed of words formed in plates, together with illuminating means behind the stencils, and a shiftable shutter between the illuminating means and the stencil, said shutter having an opening therein corresponding in size to the stenciled words.

13. An illuminated shiftable word sign, comprising a series of superposed rotatable stenciled plates in a predetermined relation to each other to form a sentence composed of words formed in plates, together with illuminating means behind the stencils, and a shiftable shutter between the illuminating means and the stencil, said shutter having an opening therein corresponding in size to the stenciled words, and means for rotating said shutter through approximately one-third of a complete revolution.

14. An illuminated shiftable word sign, comprising a series of superposed rotatable stenciled plates in a predetermined relation to each other to form a sentence composed of words formed in plates, together with illuminating means behind the stencils, and a shiftable shutter between the illuminating means and the stencil, said shutter having an opening therein corresponding in size to the stenciled words, and means for rotating said shutter through approximately one-third of a complete revolution at intervals corresponding with spaces between the words on said stenciled plates.

15. An illuminated shiftable word sign, comprising a series of superposed rotatable stenciled plates in a predetermined relation to each other to form a sentence composed of words formed in plates, together with illuminating means behind the stencils, and a shiftable shutter between the illuminating means and the stencil, said shutter having an opening therein corresponding in size to the stenciled words, and means for rotating said shutter through approximately one-third of a complete revolution at intervals corresponding with spaces between the words on said stenciled plates, said means comprising a drum rotatable by the same motive power which rotates the stencils, a pair of arms on the drum, and a projecting arm on the shutter adapted for co-operation with said drum arms.

16. An illuminated shiftable word sign, comprising a series of superposed rotatable stenciled plates in a predetermined relation to each other to form a sentence composed of words formed in plates, together with illuminating means behind the stencils, and a shiftable shutter between the illuminating means and the stencil, said shutter having an opening therein corresponding in size to the stenciled words, and means for rotating said shutter through approximately one-third of a complete revolution at intervals corresponding with spaces between the words on said stenciled plates, said means comprising a drum rotatable by the same motive power which rotates the stencils, a pair of arms on the drum, and a projecting arm on the shutter adapted for co-operation with said drum arms, one of said arms adapted to move the shutter into light transmitting position, and the other of said arms adapted to release the shutter to light stopping position.

17. An illuminated shiftable word sign, comprising a series of superposed rotatable stenciled plates in a predetermined relation to each other to form a sentence composed of words formed in plates, together with illuminating means behind the stencils, and a shiftable shutter between the illuminating means and the stencil, said shutter having an opening therein corresponding in size to the stenciled words, and means for rotating said shutter through approximately one-third of a complete revolution at intervals corresponding with spaces between the words on said stenciled plates, said means comprising a drum rotatable by the same motive power which rotates the stencils, a pair of arms on the drum, and a projecting arm on the shutter adapted for co-operation with said drum arms, one of said arms adapted to move the shutter into light transmitting position, and the other of said arms adapted to release the shutter to light stopping position, and automatic latch means for maintaining the shutter in light transmitting position.

18. An illuminated shiftable word sign, comprising a series of superposed rotatable stenciled plates in a predetermined relation to each other to form a sentence composed of words formed in plates, together with illuminating means behind the stencils, and a shiftable shutter between the illuminating means and the stencil, said shutter having an opening therein corresponding in size to the stenciled words, and means for rotating said shutter through approximately one-third of a complete revolution at intervals corresponding with spaces between the words on said stenciled plates, said means comprising a drum rotatable by the same motive power which rotates the stencils, a pair of arms on the drum, and a projecting arm on the shutter adapted for co-operation with said drum arms, one of said arms adapted to move the shutter into light transmitting position, and the other of said arms adapted to release the shutter to light stopping position, and automatic latch means for maintaining the shutter in light transmitting position, together with a cammed trip for releasing said automatic latch means.

19. An illuminated shiftable word sign, comprising a series of superposed rotatable stenciled plates in a predetermined relation to each other to form a sentence composed of words formed in plates, together with illuminating means behind the stencils, and a shiftable shutter between the illuminating means and the stencil, said shutter having an opening therein corresponding in size to the stenciled words, and means for rotating said shutter through approximately one-third of a complete revolution at intervals corresponding with spaces between the words on said stenciled plates, said means comprising a drum rotatable by the same motive power which rotates the stencils, a pair of arms on the drum, and a projecting arm on the shutter adapted for co-operation with said drum arms, one of said arms adapted to move the shutter into light transmitting position, and the other of said arms adapted to release the shutter to light stopping position, and automatic latch means for maintaining the shutter in light transmitting position, together with a cammed trip for releasing said automatic latch means, and a counterweight on the shutter for returning the same to normally closed position.

20. An illuminated shiftable word sign, comprising a series of superposed rotatable stenciled plates in a predetermined relation to each other to form a sentence composed of words formed in plates, together with illuminating means behind the stencils, and a shiftable shutter between the illuminating means and the stencil, said shutter having an opening therein corresponding in size to the stenciled words, and means for rotating said shutter through approximately one-third of a complete revolution at intervals corresponding with spaces between the words on said stenciled plates, said means comprising a drum rotatable by the same motive power which rotates the stencils, a pair of arms on the drum, and a projecting arm on the shutter adapted for co-operation with said drum arms, one of said arms adapted to move the shutter into light transmitting position, and the other of said arms adapted to release the shutter to light stopping position, and automatic latch means for maintaining the shutter in light transmitting position, together with a cammed trip for releasing said automatic latch means, and a counterweight on the shutter for returning the same to normally closed position, together with a spring co-operating with the shutter for accentuating the action of the counterweight.

21. An illuminated shiftable word sign, comprising a series of superposed rotatable stenciled plates in a predetermined relation to each other to form a sentence composed of words formed in plates, together with illuminating means behind the stencils, and a shiftable shutter between the illuminating means and the stencil, said shutter having an opening therein corresponding in size to the stenciled words, and means for rotating said shutter through approximately one-third of a complete revolution at intervals corresponding with spaces between the words on said stenciled plates, said means comprising a drum rotatable by the same motive power which rotates the stencils, a pair of arms on the drum, and a projecting arm on the shutter adapted for co-operation with said drum arms, one of said arms adapted to move the shutter into light transmitting position, and the other of said arms adapted to release the shutter to light stopping position, and automatic latch means for maintaining the shutter in light transmitting position, together with a cammed trip for releasing said automatic latch means, and a counterweight on the shutter for returning the same to normally closed position, together with a spring co-operating with the shutter for accentuating the action of the counterweight, and means for retaining said shutter in open position upon breaking of the motor actuating circuit.

22. An illuminated shiftable word sign, comprising series of superposed rotatable stenciled plates in a predetermined relation to each other to form a sentence composed of words formed in plates, together with illuminating means behind the stencils, and a shiftable shutter between the illuminating means and the stencil, said shutter having an opening therein corresponding in size to the stenciled words, and means for rotating said shutter through approximately one-third of a complete revolution at intervals corresponding with spaces between the words on said stenciled plates, said means comprising a drum rotatable by the same motive power which rotates the stencils, a pair of arms on the drum, and a projecting arm on the shutter adapted for co-operation with said drum arms, one of said arms adapted to move the shutter into light transmitting position, and the other of said arms adapted to release the shutter to light stopping position, and automatic latch means for maintaining the shutter in light transmitting position, together with a cammed trip for releasing said automatic latch means, and a counterweight on the shutter for returning the same to normally closed position, together with a spring co-operating with the shutter for accentuating the action of the counterweight, and means for retaining said shutter in open position upon breaking of the motor actuating circuit, said means comprising an auxiliary switch inserted into the motor circuit, and trip means on the shutter for opening said auxiliary switch at a point between the operation of the shutter opening and shutter closing arms.

23. An illuminated shiftable word sign, comprising a series of superposed rotatable stenciled plates in a predetermined relation to each other to form a sentence composed of words formed in plates, together with illuminating means behind the stencils, and a shiftable shutter between the illuminating means and the stencil, said shutter having an opening therein corresponding in size to the stenciled words, and means for rotating said shutter through approximately one-third of a complete revolution at intervals corresponding with spaces between the words on said stenciled plates, said means comprising a drum rotatable by the same motive power which rotates the stencils, a pair of arms on the drum, and a projecting arm on the shutter adapted for co-operation with said drum arms, one of said arms adapted to move the shutter into light transmitting position, and the other of said arms adapted to release the shutter to light stopping position, and automatic latch means for maintaining the shutter in light transmitting position, together with a cammed trip for releasing said automatic latch means, and a counterweight on the shutter for returning the same to normally closed position, together with a spring co-operating with the shutter for accentuating the action of the counterweight, and means for retaining said shutter in open position upon breaking of the motor actuating circuit, said means comprising an auxiliary switch inserted into the motor circuit, and trip means on the shutter for opening said auxiliary switch at a point between the operation of the shutter opening and shutter closing arms, together with a further switch in the motor circuit for automatically stopping the rotation of the stencils to bring a predetermined key word into illuminated display position.

24. An illuminated shiftable word sign, comprising a series of superposed rotatable stenciled plates in a predetermined relation to each other to form a sentence composed of words formed in plates, together with illuminating means behind the stencils, and a shiftable shutter between the illuminating means and the stencil, said shutter having an opening therein corresponding in size to the stenciled words, and means for rotating said shutter through approximately one-third of a complete revolution at intervals corresponding with spaces between the words on said stenciled plates, said means comprising a drum rotatable by the same motive power which rotates the stencils, a pair of arms on the drum, and a projecting arm on the shutter adapted for co-operation with said drum arms, one of said arms adapted to move the shutter into light transmitting position, and the other of said arms adapted to release the shutter to light stopping position, and automatic latch means for maintaining the shutter in light transmitting position, together with a cammed trip for releasing said automatic latch means, and a counterweight on the shutter for returning the same to normally closed position, together with a spring co-operating with the shutter for accentuating the action of the counterweight, and means for retaining said shutter in open position upon breaking of the motor actuating circuit, said means comprising an auxiliary switch inserted into the motor circuit, and trip means on the shutter for opening said auxiliary switch at a point between the operation of the shutter opening and shutter closing arms, together with a further switch in the motor circuit for automatically stopping the rotation of the stencils to bring a predetermined key word into illuminated display position, said means comprising a normally closed sliding contact associated with one of said stencils, and an insulating plate on the stencil adapted to reach under said contact at a predetermined point in its rotation.

25. An operating means for an illuminated shiftable word sign, comprising a motor, a series of consecutively operated mutilated gears driven by the motor, a barrel-gear adapted to be in constant mesh with at least one of said mutilated gears, and means for intermittently rotating said barrel-gear.

26. An operating means for an illuminated shiftable word sign, comprising a motor, a series of consecutively operated mutilated gears driven by the motor, a barrel-gear adapted to be in constant mesh with at least one of said mutilated gears, and means for intermittently rotating said barrel-gear, said means comprising a mutilated gear constantly rotated by the motor while in operation.

27. An operating means for an illuminated shiftable word sign, comprising a motor, a series of consecutively operated mutilated gears driven by the motor, a barrel-gear adapted to be in constant mesh with at least one of said mutilated gears, and means for intermittently rotating said barrel-gear, said means comprising a mutilated gear constantly rotated by the motor while in operation, and a gear shaft connection between said constantly rotated mutilated gear and the barrel-gear.

28. An operating means for an illuminated shiftable word sign, comprising a motor, a series of consecutively operated mutilated gears driven by the motor, a barrel-gear adapted to be in constant mesh with at least one of said mutilated gears, and means for intermittently rotating said barrel-gear, said means comprising a mutilated gear constantly rotated by the motor while in operation, and a gear shaft connection between said constantly rotated mutilated gear and the barrel-gear, and a rotatable stenciled plate connected to each of said first-named mutilated gears for intermittent rotation therewith.

29. An operating means for an illuminated shiftable word sign, comprising a motor, a series of consecutively operated mutilated gears driven by the motor, a barrel-gear adapted to be in constant mesh with at least one of said mutilated gears, and means for intermittently rotating said barrel-gear, said means comprising a mutilated gear constantly rotated by the motor while in operation, and a gear shaft connected between said constantly rotated mutilated gear and the barrel-gear, and a rotatable stenciled plate connected to each of said first-named mutilated gears for intermittent rotation therewith, and connections between adjacent gears for imparting an initial movement to one gear at the end of the rotative movement of the other gear.

30. An operating means for an illuminated shiftable word sign, comprising a motor, a series of consecutively operated mutilated gears driven by the motor, a barrel-gear adapted to be in constant mesh with at least one of said mutilated gears, and means for intermittently rotating said barrel-gear, said means comprising a mutilated gear constantly rotated by the motor while in operation, and a gear shaft connection between said constantly rotated mutilated gear and the barrel-gear, and a rotatable stenciled plate connected to each of said first-named mutilated gears for intermittent rotation therewith, and connections between adjacent gears for imparting an initial movement to one gear at the end of the rotative movement of the other gear, and further connections between certain of said sectional plates for imparting an initial movement from the last gear in the train of mutilated gears to the first gear in said train.

31. An illuminated shiftable word sign, comprising a series of superposed rotatable stencil plates, means for rotating each plate through a portion of its circumference during a predetermined period of time, and a shutter behind the plates, said shutter being intermittently operated to illuminate portions of the plates consecutively and in accordance with the intermittent rotation thereof.

In testimony whereof we affix our signatures.

OSCAR W. MORTENSON.
GUNNAR E. THELIN.